United States Patent [19]

Yanai et al.

[11] Patent Number: 4,511,594
[45] Date of Patent: Apr. 16, 1985

[54] SYSTEM OF MANUFACTURING MAGNETIC RECORDING MEDIA

[75] Inventors: Akio Yanai; Ryuji Shirahata, both of Kanagawa, Japan

[73] Assignee: Fuji Photo Film Co., Ltd., Kanagawa, Japan

[21] Appl. No.: 459,021

[22] Filed: Jan. 18, 1983

[30] Foreign Application Priority Data

Jan. 28, 1982 [JP] Japan .................. 57-12282

[51] Int. Cl.³ ............................................ C23C 13/08
[52] U.S. Cl. .................................... 427/38; 118/50.1; 118/723; 118/726; 118/729; 204/192 N; 427/39; 427/42; 427/132; 427/250; 427/251; 427/294
[58] Field of Search .................. 427/42, 132, 250, 251, 427/294, 38, 39; 118/50.1, 723, 726, 729; 204/192 N

[56] References Cited

U.S. PATENT DOCUMENTS 3,908,183  9/1975  Ennis ............................ 427/38
3,929,604 12/1975  Shirahata ..................... 427/39
4,098,919  7/1978  Morimoto et al. ........... 204/192 N
4,354,909 10/1982  Takagi et al. ................. 427/42
4,400,444  8/1983  Izumi et al. ................... 427/133

FOREIGN PATENT DOCUMENTS 54-100987  9/1979  Japan ............................ 118/723

Primary Examiner—Norman Morgenstern
Assistant Examiner—Janyce A. Bell
Attorney, Agent, or Firm—Sughrue, Mion, Zinn, Macpeak & Seas

[57] ABSTRACT

A system of manufacturing a magnetic recording medium in which a magnetic metal or alloy is heated and evaporated by an electron beam gun so that vacuum-evaporated magnetic film is formed on a non-organic or organic macromolecular base. A plasma generating coil is disposed near an evaporating source and an electron beam passes through the hollow portion of the coil in preferably a direction coaxial with the axis of the coil. High frequency power is applied to the coil and vacuum deposition is carried out with a plasma generated thereby. The flow of vapor of magnetic metal or alloy is applied obliquely to the base and an oxidation gas is introduced into a vacuum container for forming the magnetic film.

12 Claims, 3 Drawing Figures

SYSTEM OF MANUFACTURING MAGNETIC RECORDING MEDIA

BACKGROUND OF THE INVENTION

This invention relates to a method of manufacturing a ferromagnetic metal film type magnetic recording medium which has improved electro-magnetic conversion characteristics and high uniformity.

A conventional magnetic recording medium has been manufactured by a method in which magnetic powder, typically $\gamma\text{-}Fe_2O_3$, dispersed in organic binder is coated over a non-magnetic support and is then dried. Recently, in order to increase the recording density, a method of manufacturing a magnetic recording medium by forming a ferromagnetic metal film by vacuum deposition, sputtering or plating has been proposed, and an effort for practicing the method has been made.

The method of manufacturing a magnetic recording medium by vacuum deposition is especially advantageous in that, unlike the method of manufacturing a magnetic recording medium by plating, treatment of waste solution is unnecessary. Moreover, the manufacturing process is simple and the deposition speed is high. In order to improve the close contact of the vacuum-evaporated film with the base or to improve the electro-magnetic conversion characteristic, a method has been proposed in which a metal vapor flow from the evaporating source, namely, the crucible is ionized with high frequency power or thermions. The metal vapor flow thus ionized is applied to the base to form the film. This conventional method has been practically employed for certain purposes; however, it has not been suitable for the case where, as in the case of manufacturing a magnetic tape, an uniform film is formed on a web-shaped support for a long period of time.

In order to eliminate the above-described drawbacks and to improve the electro-magnetic conversion characteristic, the inventors have conducted intensive research on a method of forming a stable film by ionizing a metal vapor flow with high frequency power, and have achieved the present invention.

SUMMARY OF THE INVENTION

Given the deficiencies of the prior art, it is an object of this invention to define a system of manufacturing magnetic recording film in a stable uniform manner.

It is another object of this invention to provide a system of manufacturing a magnetic recording film having an improved electro-magnetic conversion characteristic.

In the system of manufacturing a magnetic recording medium according to the invention, a plasma generating coil is disposed near an evaporating source, and while an electron beam is applied through the hollow of the coil to a magnetic metal or alloy. High frequency power is applied to the coil to generate a plasma, whereby a magnetic film is formed by vacuum evaporation in the plasma. Furthermore, an electrode, to which negative potential with respect to the evaporating source is applied, is provided near the base, or near the base and the evaporating source, to accelerate the flow of ionized vapor, whereby an improved magnetic film electro-magnetic conversion characteristic is obtained.

According to the invention, in order to increase the coercive force of the magnetic recording medium, the flow of ionized vapor is applied obliquely to the base. Furthermore, in the practice of this invention, in order to allow the magnetic film to contain oxygen, the film is formed in an oxidizing atmosphere.

An electron beam gun employed in the invention may be a transverse type electron beam gun or a self-accelerating type (or Pierce type) electron beam gun. The latter is advantageous, in order to vaporize a large quantity of magnetic material depending on the scale of manufacture.

In manufacturing a magnetic recording medium according to a vacuum-depositing method of the invention, examples of a ferromagnetic metal for forming the magnetic film are metals such as Fe, Co and Ni, and ferromagnetic alloys such as Fe-Co, Fe-Ni, Co-Ni, Fe-Co-Ni, Fe-Rh, Fe-Cu, Co-Cu, Co-Au, Co-Y, Co-La, Co-Pr, Co-Gd, Co-Sm, Co-Pt, Ni-Cu, Mn-Bi, Mn-Sb, Mn-Al, Fe-Cr, Co-Cr, Ni-Cr, Fe-Co-Cr and Fe-Co-Ni-Cr alloys. The thickness of the magnetic film is generally 0.05 to 1.0 μm, preferably 0.08 to 0.3 μm, because the thickness must be large enough to provide a sufficient output as a magnetic recording medium and small enough to satisfactorily perform a high density recording operation. Examples of the flexible support (base) are plastic bases such as polyehtylene terephthalate, polyvinyl chloride, cellulose triacetate, polyimide, polyamide, polycarbonate and polyethylene naphthalate bases, or metal belts such as Al, Al alloy, Ti, Ti alloy and stainless steel belts.

This invention will be described in greater detail by referring to the drawing and the description of the preferred embodiment that follows.

DETAILED DESCRIPTION OF THE PREFERRED EMBODIMENTS

Figure 1:
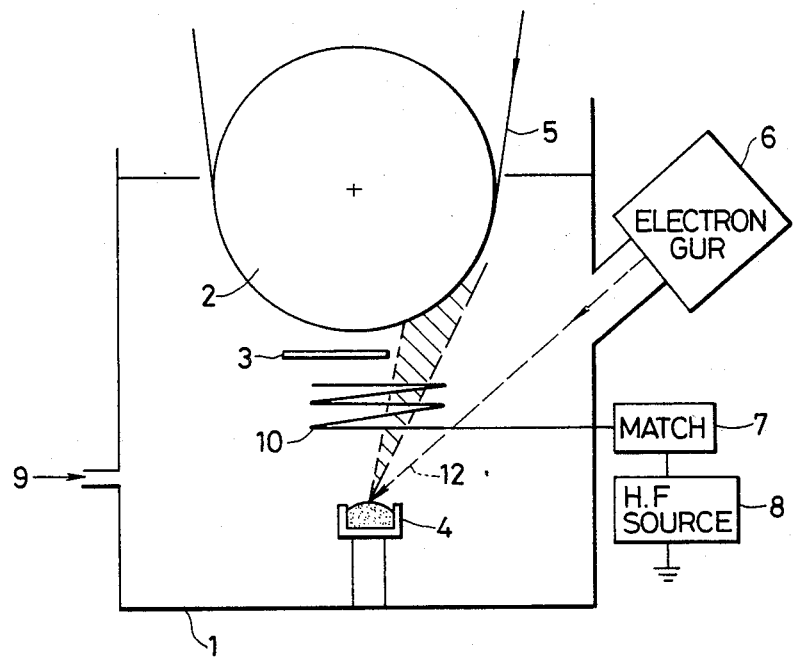
FIG. 1 shows one example of a conventional magnetic recording medium manufacturing vacuum evaporator with a high frequency applying mechanism.

FIG. 1 illustrates one example of a conventional vacuum evaporator for manufacturing a magnetic recording medium which has a high frequency applying mechanism. A vacuum container 1 is divided into the upper chamber (not shown) and the lower chamber. A cooling can 2 is provided between the upper and lower chambers. A tape-shaped support 5 is conveyed from the upper chamber to the lower chamber where vacuum deposition is carried out and is then conveyed from the lower chamber to the upper chamber. A crucible, or a magnetic material evaporating source 4, is disposed below the cooling can 2. The vapor evaporated from the evaporating source is applied obliquely to the tape-shaped support, which is moved along the cooling can 2. Oblique deposition occurs due to the presence of a mask 3. The magnetic material in the crucible 4 is heated by an electron beam from an electron gun 6. A high frequency applying coil 10 is disposed between the cooling can 2 and the evaporating source 4. The coil 10 is coupled through a matching box 7 to a high frequency source 8. The vacuum container 1 has a gas inlet 9 through which desired gas is introduced into the lower chamber.

Figure 2:
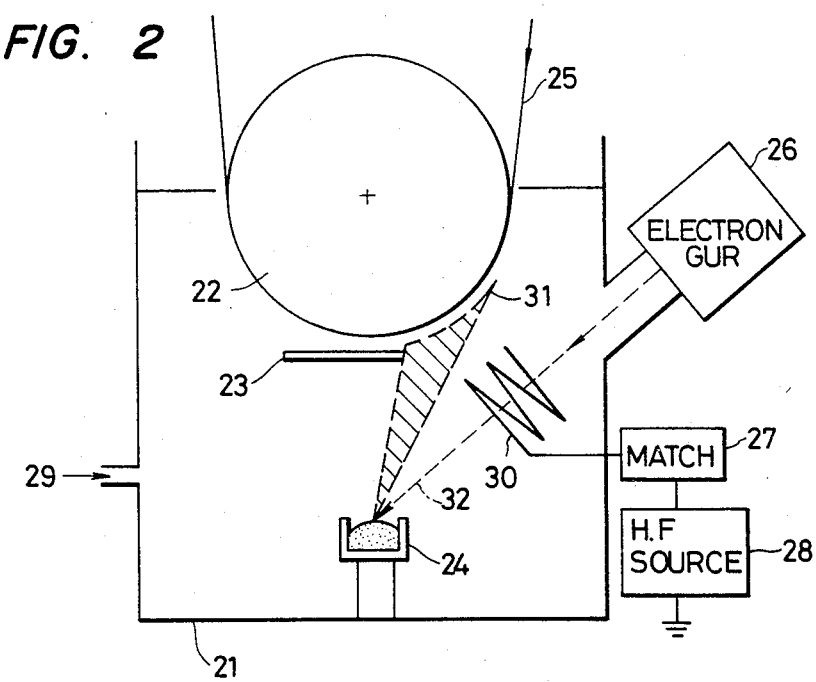
FIG. 2 shows one example of a magnetic recording medium manufacturing vacuum evaporator according to this invention.

FIG. 2 illustrates one example of vacuum evaporator for practicing a magnetic recording medium manufacturing method according to this invention. As in FIG. 1, a cooling can 22, a mask 23, a crucible 24, a tape-shaped support 25 and an electron gun 26 are provided in a vacuum container 21. The vacuum evaporator has a matching box 27, high frequency source 28 and a gas introducing mechanism 29. The vacuum evaporator according to the invention has a plasma generating coil 30 for high frequency application. The coil 30 is arranged so that an electron beam 32 from the electron gun 26, typically a Pierce type, passes through the coil 30. That is, the central axis of the coil 30 is substantially coaxial with the axis (or path) of the electron beam 32. An electron 31 is disposed near the cooling can 22 so as to apply a negative DC voltage to the evaporating source 24.

Figure 3:
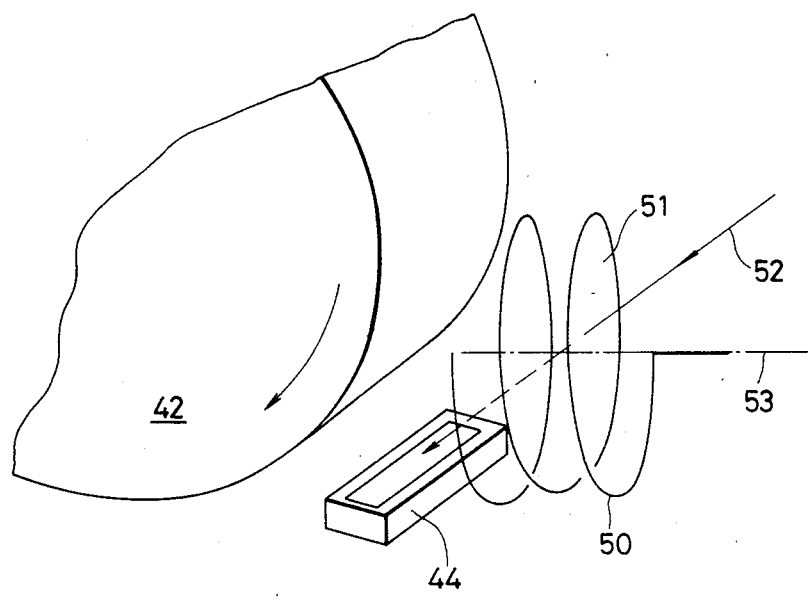
FIG. 3 shows a modification of the relation between a plasma generating coil and an electron beam path according to the invention.

FIG. 3 illustrates another example of the arrangement of the plasma generating coil and the electron beam path. A crucible, or an evaporating source 44, is disposed below a cooling can 42. The magnetic material in the crucible 44 is heated by an electron beam 52. The electron beam 52 passes through the hollow 51 which is defined by the plasma generating coil 50 to reach the crucible 44. The path (axis) of the electron beam 52 forms an angle with the central axis 53 of the plasma generating coil 50 in this modification.

The invention will be described with reference to its concrete examples; however, it should be noted that the invention is not limited thereto.

CONCRETE EXAMPLE 1

The winding type vacuum evaporators as shown in FIGS. 1 and 2 were used to form magnetic tapes by forming a cobalt magnetic film on a polyethylene terephthalate base 15 $\mu$m in thickness. Oxygen gas was introduced into the vacuum containers respectively through the gas introducing mechanisms 9 and 29. The flow rate of the oxygen gas was adjusted so that the pressure in the vacuum containes were $1 \times 10^{-4}$ Torr. A high frequency (13.56 MHz) signal of 600 W was applied to the coils 10 and 30 so that plasmas were generated in the vacuum containers. A DC voltage of $-1$ kV was applied to the accelerating electrode 31. Oblique incident angles regulated by the masks 3 and 23 were set to 50°. Vacuum deposition was performed until the thickness of the cobalt magnetic deposition film reached 1200 Å. The irregularity in thickness, the video output signal of 6 MHz with a VHS type VTR, and the bulk noise of each of the tapes thus manufactured, were measured. The results of these measurements are as indicated in a table below:

As is apparent from the table, the magnetic tape according to the manufacturing method of this invention is excellent in the uniformity of film thickness in the longitudinal direction, in video output and in noise.

TABLE

| Coil Arrangement | DC Voltage Application | Longitudinal Film Thickness Irregularity | Video Output | Noise |
| --- | --- | --- | --- | --- |
| FIG. 1 | Not applied | ±15% | 0 dB | 0 dB |
| FIG. 2 | Not applied | ±8% | 3.0 dB | −5.0 dB |
| FIG. 3 | Applied | ±6% | 4.0 dB | −6.0 dB |

CONCRETE EXAMPLE 2

The winding type vacuum evaporators with the coils arranged as shown in FIGS. 1 and 3 were used. Magnetic tapes were manufactured by vacuum-depositing a Co-Ni alloy film 1500 Å in thickness (Ni being 15 wt%) on a polyethylene terephthalate base, 20 $\mu$m in thickness. During vacuum deposition, a mixed gas of oxigen and argon with a ratio of 5:2 was introduced through the gas introducing mechanisms 9 and 29 to the regions where the vacuum deposition was effected, so that the pressures in the vacuum containers were $1.4 \times 10^{-4}$ Torr.

The oblique incident angles regulated by the masks were set to 45°.

The characteristics of the magnetic tapes which were manufactured with a high frequency power of 1 kW were measured similarly as in Concrete Example 1. The results of measurement are as listed in a table below:

TABLE

| Coil Arrangement | Longitudinal Film Thickness Irregularity | Video Output | Noise |
| --- | --- | --- | --- |
| FIG. 1 | ±16% | 0 dB | 0 dB |
| FIG. 3 | ±10% | 3.0 dB | −4.5 dB |

As is apparent from the table, the magnetic tape according the manufacturing method of the invention is excellent in the uniformity of film thickness in the longitudinal direction, in video output and in noise.

As is clear from the above-described concrete examples, the system of manufaturing a magnetic recording medium by vacuum depostion in a plasma with the high frequency coil disposed so that the electron beam passes through the hollow of the high frequency coil can provide a magnetic tape which is excellent in the uniformity of film thickness in the longitudinal direction, high in video output and low in noise. Thus, the invention offers a significant improvement in the manufacturing magnetic tapes by vacuum deposition.

What is claimed is:

1. A method of manufacturing a magnetic recording medium in a vacuum chamber in which magnetic metal or alloy is heated and evaporated by an electron beam gun so that a vacuum-evaporated magnetic film is formed on a non-organic or organic macromolecular base, comprising the steps of:
   disposing a plasma generating coil near an evaporation source,
   generating an electron beam that passes through a hollow portion of said coil and strikes said magnetic metal or alloy in said evaporation source, and
   applying high frequency power to said coil, whereby vacuum deposition is carried out with a plasma thus generated.

2. A method as claimed in claim 1, wherein said beam is directed such that the central axis of said plasma generating coil is substantially coaxial with the path of said electron beam.

3. A method as claimed in claim 1, further comprising the step of obliquely applying the flow of vapor of said magnetic metal or alloy to said base to form a magnetic film.

4. A method as claimed in claim 1, further comprising the step of introducing an oxidation gas into a vacuum container for forming said magnetic film.

5. A method as claimed in claim 1, further comprising the step of applying a negative potential with respect to a crucible containing said magnetic metal or alloy to said base or an electrode disposed near said base.

6. A method as claimed in claim 1, wherein said electron beam gun is a self focusing type electron beam gun.

7. An apparatus for manufacturing a magnetic recording medium comprising:
   means to convey a base material through a vacuum chamber;
   means adapted to hold an evaporation source containing a magnetic;
   a metal or alloy in said evaporation source;
   a plasma generating coil disposed proximate to said evaporation source;
   an electron beam gun from which an electron beam is emitted to pass through a hollow portion of said coil and strikes the magnetic metal or alloy in said evaporation source;
   a source of high frequency to actuate said coil and generate a plasma whereby vacuum deposition of evaporated magnetic metal or alloy onto said base is effectuated.

8. The apparatus of claim 7, wherein the central axis of said plasma generating coil is substantially coaxial with the path of said electron beam.

9. The apparatus of claim 7, further comprising means adapted to obliquely apply the flow of evaporated magnetic metal or alloy onto said base as it passes through said vacuum chamber.

10. The apparatus of claim 7, further comprising means for introducing an oxidation gas into said vacuum chamber.

11. The apparatus of claim 7, further comprising means for applying a negative potential with respect to said means adapted to hold said evaporation source to said base.

12. The apparatus of claim 7, whether said electron gun comprises a self focusing type electron beam gun.

* * * * *